United States Patent
Judisch

(10) Patent No.: US 9,248,724 B1
(45) Date of Patent: Feb. 2, 2016

(54) TRANSPARENT RETRACTABLE CURTAINS FOR A GOLF CART

(71) Applicant: Joshua E. Judisch, Waverly, IA (US)

(72) Inventor: Joshua E. Judisch, Waverly, IA (US)

( * ) Notice: Subject to any disclaimer, the term of this patent is extended or adjusted under 35 U.S.C. 154(b) by 0 days.

(21) Appl. No.: 14/480,864

(22) Filed: Sep. 9, 2014

(51) Int. Cl.
  *B60N 3/00* (2006.01)
  *B60J 5/06* (2006.01)
  *B60J 5/04* (2006.01)

(52) U.S. Cl.
  CPC ............... *B60J 5/067* (2013.01); *B60J 5/0487* (2013.01)

(58) Field of Classification Search
  CPC .......................... B60J 5/067; B60J 5/0487
  USPC ................................................... 296/81, 83
  See application file for complete search history.

(56) References Cited

U.S. PATENT DOCUMENTS

| | | | |
|---|---|---|---|
| 4,792,175 A | 12/1988 | Gerber | |
| 4,795,205 A | 1/1989 | Gerber | |
| 5,211,214 A | 5/1993 | Shaw | |
| 6,439,637 B1 * | 8/2002 | Tyrer | B60J 1/04 296/145 |
| 6,761,391 B2 * | 7/2004 | Winkler | B60J 7/10 296/145 |
| 7,147,263 B2 | 12/2006 | Schneidau | |
| 7,311,347 B1 | 12/2007 | Aller | |
| 8,292,355 B2 | 10/2012 | Miller | |
| 8,882,170 B2 * | 11/2014 | Brown, Jr. | B60J 5/0487 296/79 |
| 2002/0027373 A1 | 3/2002 | Winkler | |
| 2004/0007894 A1 | 1/2004 | Hamm | |
| 2004/0239140 A1 | 12/2004 | Feinberg | |
| 2007/0235482 A1 | 10/2007 | Laborie | |
| 2008/0185860 A1 * | 8/2008 | Sersland | A01M 31/02 296/26.09 |
| 2010/0276961 A1 | 11/2010 | Haagenson | |
| 2015/0102630 A1 * | 4/2015 | Guzzetta | B60J 5/065 296/147 |

* cited by examiner

Primary Examiner — Lori L Lyjak
(74) Attorney, Agent, or Firm — Sturm & Fix LLP

(57) ABSTRACT

Side curtains for golf carts are provided using transparent flexible plastic sheets that are selectively retractable into or under a roof of a golf cart.

7 Claims, 6 Drawing Sheets

TRANSPARENT RETRACTABLE CURTAINS FOR A GOLF CART

TECHNICAL FIELD

This invention relates generally to golf carts and more particularly to transparent retractable curtains for golf carts.

BACKGROUND

Golf carts usually have a roof to shield a user of the golf cart from rain. Quite often golf carts also have a windshield. Most golf carts do not have rear windows or side windows however, though the prior art shows some structures for keeping rain from the rear and/or sides of a golf cart.

U.S. Pat. No. 4,795,205 to Gerber discloses a retractable windshield for a golf cart, but uses flexible curtains to prevent rain from entering the rear and parts of the sides of his golf cart. U.S. Pat. No. 8,292,355 also discloses a retractable windshield, but for an all terrain vehicle.

Published U.S. Patent Application No. 2010/0276961 to Haagenson shows removable side curtains for a golf cart, which side curtains can be used when rain seems likely or possible, but are not permanently attached to the golf cart for times when the user thinks it is unlikely to rain.

The prior art side curtains are cumbersome, difficult to see through, appear as a temporary accessory instead of a permanent solution and are generally not aesthetically pleasing to the eye of traditional golfers.

Accordingly, there is a need for a better solution to keeping a golfer dry when the golfer is using a golf cart on a golf course than solutions available in the past.

SUMMARY OF THE INVENTION

The present invention relates to a improved side curtain device for golf carts that uses flexible plastic side curtains that are retractable into or under a roof of a golf cart.

BRIEF DESCRIPTION OF THE DRAWINGS

The above need is at least partially met through provision of the apparatus described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
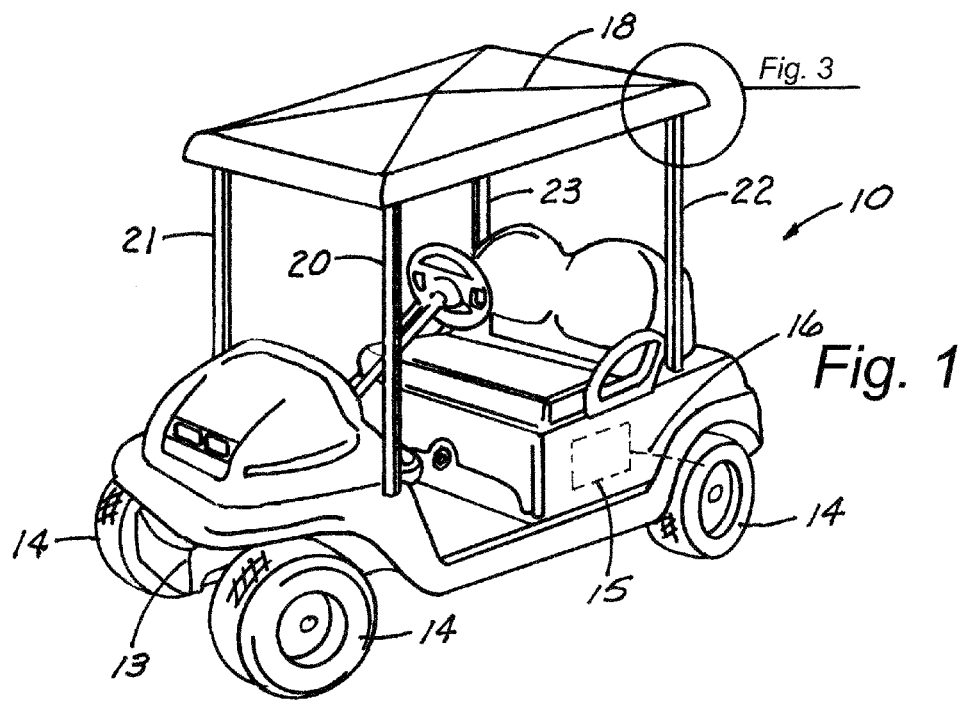
FIG. 1 is a perspective view of a golf cart showing the present invention with side curtains in an up position, retracted under the roof of the golf cart.

Referring now to the drawings, wherein like reference numerals indicate identical or similar parts throughout the several views, FIG. 1 shows a golf cart 10 constructed in accordance with the present invention.

Figure 2:
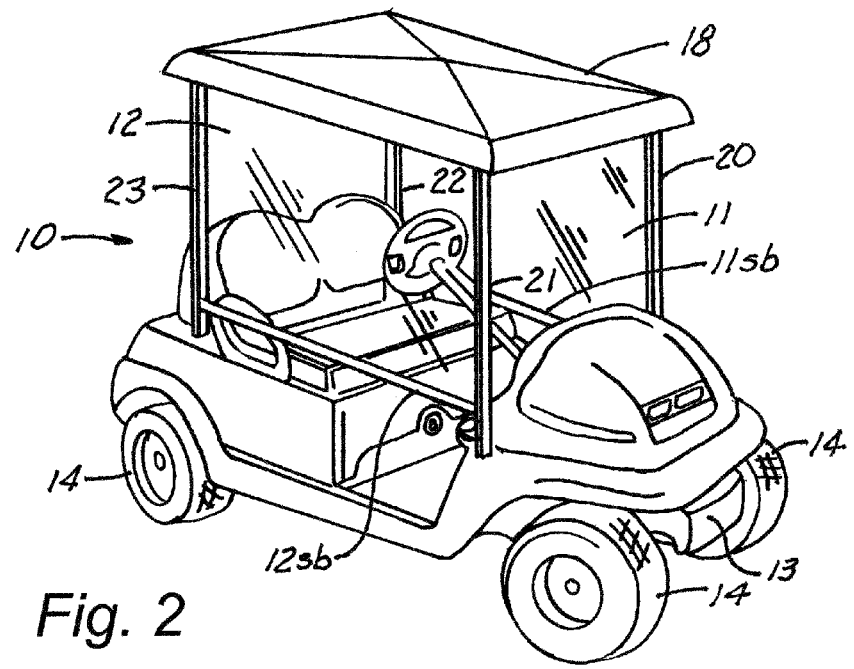
FIG. 2 is another view of the golf cart of FIG. 1 with the side curtains of the present invention in a utilized pulled down position to shield persons sitting in the golf cart from rain.

Retractable side curtains 11 and 12, shown in FIG. 2 are flexible sheets of transparent plastic such as, but not limited to, sheet grade polycarbonate (aka LEXAN® or MAKROLON®). Polycarbonate (aka LEXAN® or MAKROLON®) and acrylic sheet (aka LUCITE®) are two of the most frequently used see-through plastics. Each of the two aforementioned plastics have benefits and drawbacks. Acrylic is shinier and polycarbonate is stronger. Acrylic is less expensive but easier to crack. Polycarbonate is more impact resistant but easier to scratch. Acrylic and polycarbonate plastics are both stronger and lighter than un-tempered glass. Acrylic is four to eight times stronger than glass, while polycarbonate is about two hundred times stronger than glass. A LEXAN® polycarbonate sheet between 0.04-0.06 thick is one possible option for side curtains 11 and 12, but other clear sheets of material can be used instead if desired.

The golf cart 10 includes a frame 13, shown in FIGS. 1 and 2 with wheels 14 operatively rotatably attached to the frame 13. The golf cart 10 has an internal combustion engine 15 (or electric motor 15) attached via a transmission 16 operatively attaching the engine or motor 15 to the wheels 14, both shown schematically in dashed lines in FIG. 1, for selectively rotating the wheels 14.

A seat 17 is operatively attached to the frame, as can be seen in FIGS. 1 and 2, and a roof 18 is disposed above the seat 17 in a conventional fashion.

Figure 6:
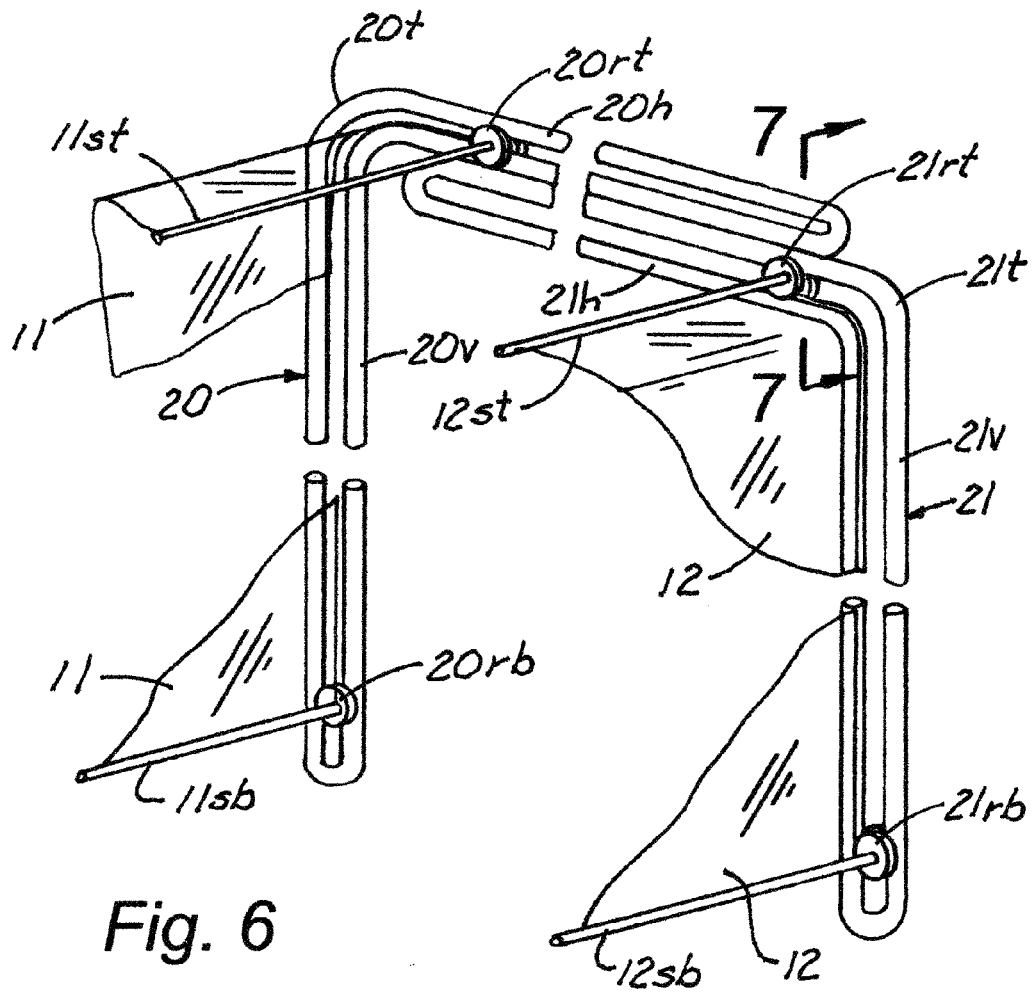
FIG. 6 is a partial perspective view looking towards the front of the golf cart with golf cart parts removed to show the front right and left tracks with the left and right side curtains pulled down as shown in FIG. 2.

FIG. 6 is from a perspective of a person standing on the right side of the golf cart 10, just behind where "FIG. 2" is printed on FIG. 2, and looking forward and to the left. So with the roof removed, when viewed from this position, a person can see a left side front vertical rail 20 that is operatively attached to the frame 13 and to the roof 18. Looking at FIGS. 6-8, the left side front vertical rail 20 has a horizontal portion 20$h$ attached to a top end of the left side front vertical portion 20$v$, the horizontal portion 20$h$ of the left side front vertical rail being disposed at least partially below the roof 18. A transition, bend portion 20$t$ connects the vertical portion 20$v$ with the horizontal portion 20$h$. The left curtain 11 is associated with the track 20. The left curtain has a top side stiffener 11$st$ and a bottom side stiffener 11$sb$.

Figure 7:
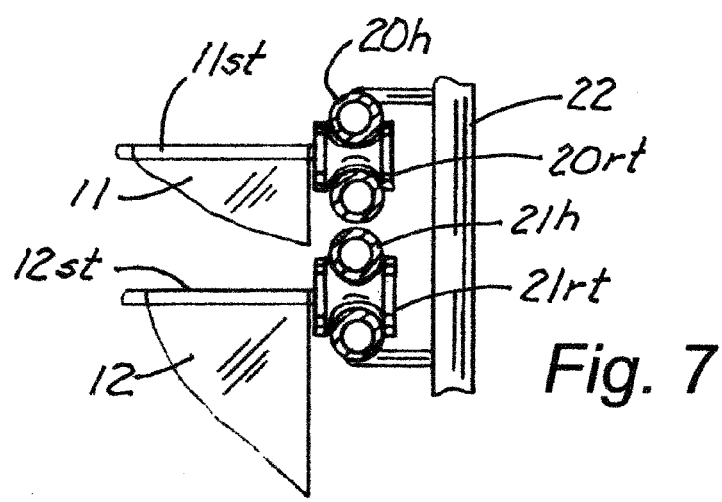
FIG. 7 is a cross sectional view taken along lines 7-7 of FIG. 6 to show the front left and right side top rollers.
Figure 8:
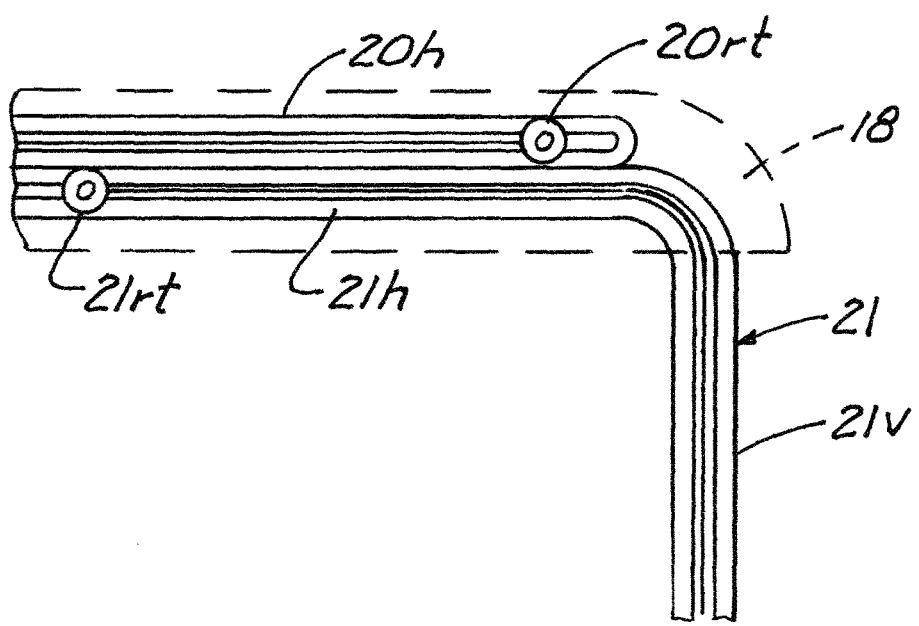
FIG. 8 is a partial elevational view of what is shown in FIG. 7, with the roof shown in dashed lines.
Figure 8:
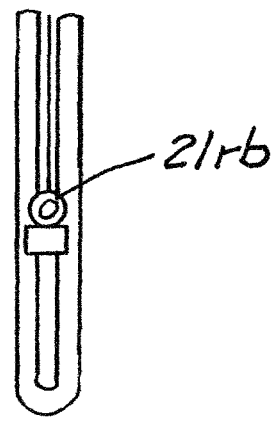

Still looking to FIGS. 6-8, a right side front vertical rail 21 is operatively attached to the frame 13 and to the roof 18, the right side front vertical rail 21 having a horizontal portion 21$h$ attached to a top end of the right side front vertical portion 21$v$. The horizontal portion 21$h$ of the right side front vertical rail is disposed at least partially below the roof 18. A transition, bend portion 21$t$ connects the vertical portion 21$v$ with the horizontal portion 21$h$. The right curtain 12 is associated with the track 21.

Figure 3:
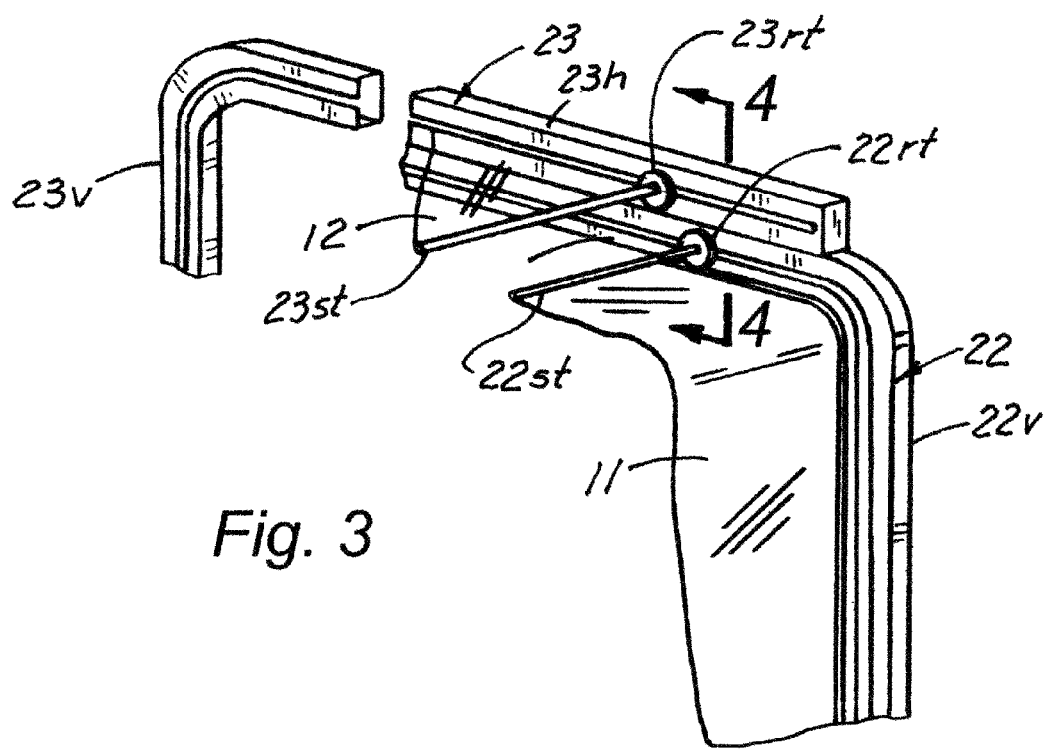
FIG. 3 is a preferred embodiment of the present invention showing the portion in the circle of FIG. 1 in more detail with that portion of the roof removed to expose a rear left side track receiving rollers that permit a transparent sheet of plastic material forming a left side side curtain to be in the pulled down position as shown in FIG. 2 and showing a right rear side track with the right side curtain up in the retracted position thereof.
Figure 4:
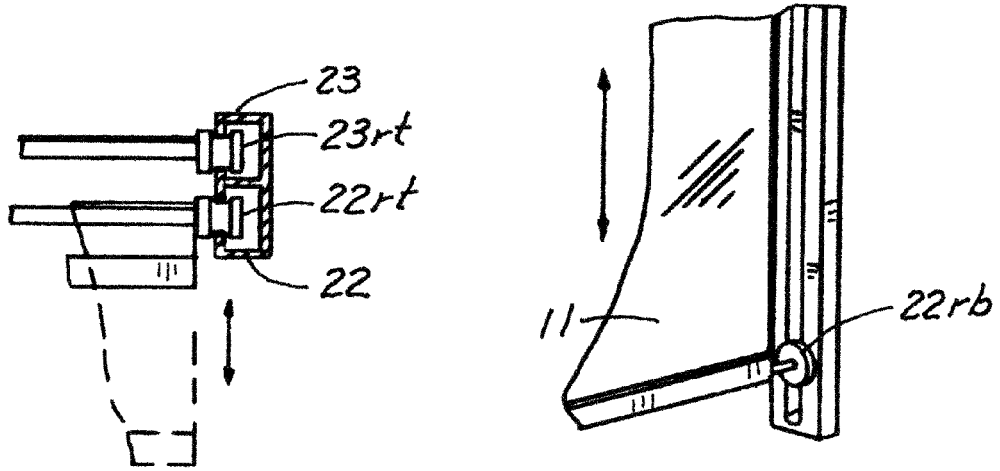
FIG. 4 is a cross sectional view taken along line 4-4 of FIG. 3, showing the rollers in the horizontal portion of the rear right and left side tracks.
Figure 5:
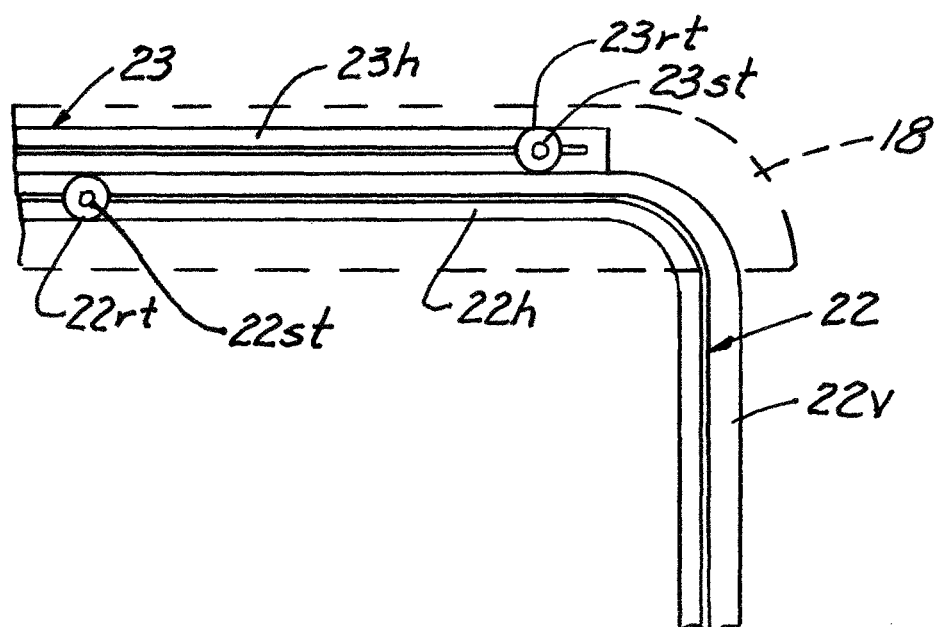
FIG. 5 is a view of the rear tracks and rear rollers looking rearwardly from the middle of the golf cart, but which would be a similar view if looking forwardly from the middle of the golf cart towards the front tracks and front rollers of the golf cart.

Looking now at FIG. 3, this view would be from the perspective of a person looking at FIG. 1, generally at the circle labeled "FIG. 3" and the area around that circle. In FIGS. 3-5, a left side rear vertical rail 22 is operatively attached to the frame 13 and to the roof 18, the left side rear vertical portion rail 22 having a horizontal portion 22$h$ attached to a top end of the left side rear vertical portion 22$v$, the horizontal portion 22$h$ of the left side rear vertical rail 22 being disposed at least partially below the roof 18. The left curtain 11 is associated with the tracks 20 and 22 as can be readily seen in FIG. 1.

Looking at FIGS. 2 and 3-5, the right curtain 12 is associated with the tracks 21 and 23. A right side rear vertical rail 23 is operatively attached to the frame 13 and to the roof 18, the right side rear vertical rail 23 having a horizontal portion 23$h$ attached to a top end of the right side rear vertical rail 23, the horizontal portion 23$h$ of the right side rear vertical portion 23$v$ being disposed at least partially below the roof 18.

Looking now again to FIGS. 6-8, first, top, track follower roller 20$rt$ and bottom track follower 20$rb$ are disposed in the left side front vertical rail 20, the first track follower roller 20$rt$ extending, at least at times, into the horizontal portion 20$h$ of the left side front vertical track 20 as can best be seen in FIGS. 6 and 7. A second track follower 21$rb$ is disposed in the right side rear vertical rail 21, the second track follower 21$rb$ extending into the vertical portion 21$v$ of the right side rear vertical track 21. Right track top follower 21$rt$ is mounted on shaft 12$st$.

Referring now again to FIGS. 3-5, a third track follower 23$rt$ mounted on shaft 23$st$ is disposed in the right side rear vertical rail 23, the third track follower 23$rt$ extending into the horizontal portion 23$h$ of the right side front vertical track 23. A fourth track follower 22$rt$ mounted on shaft 22$st$ is disposed in the left side rear vertical rail 22, the fourth track follower 22$rt$ extending into the horizontal portion 22$h$ of the right side rear vertical track 22. The track follower 22$rt$ is rotatably attached to a stiffener portion 22$s$ (FIG. 3). The track follower 20$rt$ at the top front of the first, left, flexible sheet 11 is operatively rotatably attached to the top left stiffener 11$st$. Right side bottom follower 22$rb$ is shown at the bottom of FIGS. 3 and 5.

The bottom end 11$sb$ of the first flexible sheet 11 of transparent material has a first position (FIG. 2) below the seat 17 for shielding rain from a person sitting on a left side the seat 17 and a second position (FIG. 1) near the roof 18 above the seat 18 to allow the first person to move from sitting on the left side of the seat 18 to a position standing on the ground adjacent the left side of the seat.

The bottom end 12$sb$ of the second flexible sheet 12 of transparent material has a first position (FIG. 2) below the seat 17 for shielding rain from a second person sitting on a right side the seat 17 and a second position (FIG. 1) near the roof 18 above the seat 18 to allow the second person to move from sitting on the right side of the seat 17 to a position standing on the ground adjacent the right side of the seat.

Figure 9:
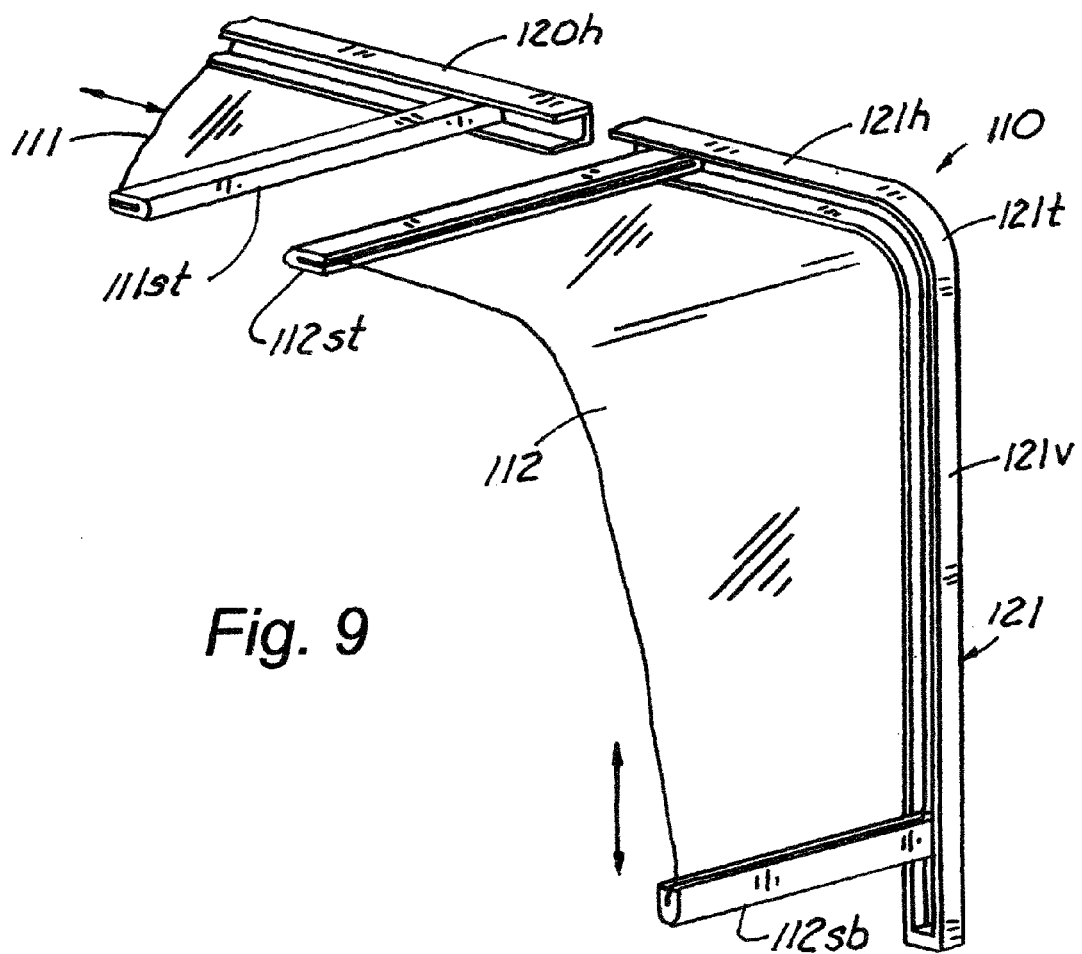
FIG. 9 shows an alternate embodiment similar to FIG. 6, the difference being that the rollers of the FIGS. 1-6 embodiment are replaced with slide members arranged to slide in tracks that are made to conform to the side of the slide members.
Figure 10:
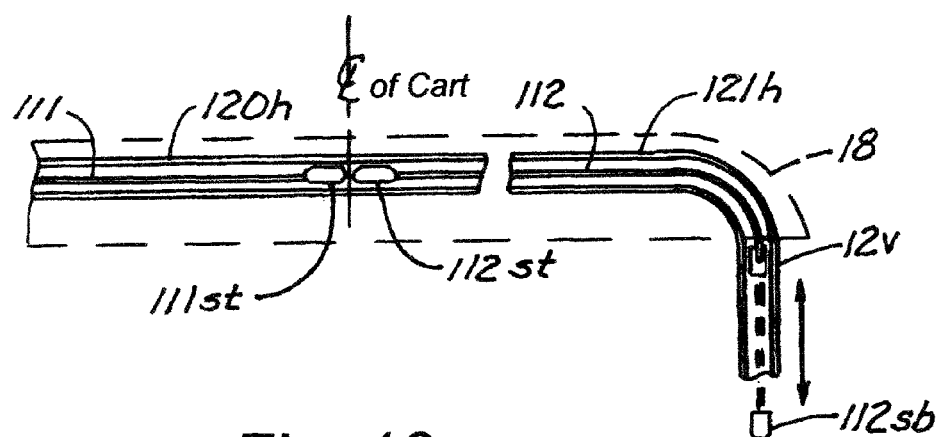
FIG. 10 is an elevational view of the front track of the FIG. 9 embodiment looking from the center of the golf cart forwardly to show that the right and left side front tracks are made in one U-shaped aluminum extrusion with the right and left side curtains shown in the up or retracted position mostly under the roof shown in dashed lines and which can be pulled down to the utilized position shown in FIG. 9 to shield rain from persons sitting on the seat of the golf cart.

The alternate embodiment 110 of FIGS. 9 and 10 is substantially like the embodiment 10 of FIGS. 1-8, except instead of using rollers, the top ends of top and bottom stiffeners 111$st$, 112$st$ and 112$sb$, of transparent flexible sheets 111 and 112 slide in portions 12$v$, 120$v$, 120$h$, 121$v$, 121$t$ and 121$h$ of tracks 120 and 121.

The bottom end of the first flexible sheet 11 of transparent material has a first position below the seat as shown in FIG. 2 for shielding rain from a person sitting on a left side the seat and a second position (FIG. 1) near the roof above the seat to allow the first person to move from sitting on the left side of the seat to a position standing on the ground adjacent the left side of the seat. Likewise, the bottom end of the second flexible sheet 12 of transparent material has a first position (FIG. 2) below the seat for shielding rain from a second person sitting on a right side of the seat and a second position (FIG. 1) near the roof above the right side of the seat to allow the second person to move from sitting on the right side of the seat to a position standing on the ground adjacent the right side of the seat.

In operation, the golf cart 10 would be used in the FIG. 1 position with the side curtains 11 and 12 up in good weather. But when it starts to rain, the side curtains 11 and 12 can be pulled down to the FIG. 2 position whenever needed. Persons using the golf cart 10 can pull the side curtains up or down and often as desired. For example a golfer may wish to drive the golf cart 10 to his or her golf ball with the side curtains down and when ready to hit the next shot, push the side curtain up, hit the ball, re-enter the golf cart 10, pull the side curtain down and proceed to make the next shot. This permits the user to play golf in light rainy conditions without getting wet while seated in the golf cart.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims, for example it would be fully equivalent to use the claimed side curtain structure of the present invention as a windshield or as a rear window on a golf cart.

I claim:
1. A golf cart with a retractable side window comprising:
   a frame;
   wheels operatively rotatably attached to the frame;
   an engine or motor;
   a transmission operatively attaching the engine or motor to the wheels for selectively rotating the wheels;
   a seat operatively attached to the frame;

a roof disposed above the seat;

a left side front vertical rail operatively attached to the frame and to the roof, the left side front vertical rail having a horizontal portion attached to a top end of the left side front vertical rail, the horizontal portion of the left side front vertical rail being disposed at least partially below the roof;

a right side front vertical rail operatively attached to the frame and to the roof, the right side front vertical rail having a horizontal portion attached to a top end of the right side front vertical rail, the horizontal portion of the right side front vertical rail being disposed at least partially below the roof;

a left side rear vertical rail operatively attached to the frame and to the roof, the left side rear vertical rail having a horizontal portion attached to a top end of the left side rear vertical rail, the horizontal portion of the left side rear vertical rail being disposed at least partially below the roof;

a right side rear vertical rail operatively attached to the frame and to the roof, the right side rear vertical rail having a horizontal portion attached to a top end of the right side rear vertical rail, the horizontal portion of the right side rear vertical rail being disposed at least partially below the roof;

a first track follower disposed in the left side front vertical rail, the first track follower extending into the horizontal portion of the left side front vertical track;

a second track follower disposed in the left side rear vertical rail, the second track extending into the vertical portion of the left side rear vertical track;

a third track follower disposed in the right side front vertical rail, the first track follower extending into the horizontal portion of the right side front vertical track;

a fourth track follower disposed in the right side rear vertical rail, the second track follower extending into the vertical portion of the right side rear vertical track;

a first flexible sheet of transparent material having a top end and a bottom end, the top end being operatively attached to the first and second track follower;

a second flexible sheet of transparent material having a top end and a bottom end, the top end being operatively attached to the third and fourth track followers;

the bottom end of the first flexible sheet of transparent material having a first position below the seat for shielding rain from a person sitting on a left side the seat and a second position near the roof above the seat to allow the first person to move from sitting on the left side of the seat to a position standing on the ground adjacent the left side of the seat; and the bottom end of the second flexible sheet of transparent material having a first position below the seat for shielding rain from a second person sitting on a right side of the seat and a second position near the roof above the right side of the seat to allow the second person to move from sitting on the right side of the seat to a position standing on the ground adjacent the right side of the seat.

2. The golf cart of claim 1 wherein the first substantially horizontal top track follower member comprises a roller operatively attached to the top end of the first flexible sheet of transparent material.

3. The golf cart of claim 2 including a third substantially horizontal top track follower member operatively connected to the bottom of the first flexible sheet, the third substantially horizontal top track follower member being disposed in the first track on a front portion thereof and disposed in the second track at the rear thereof.

4. The golf cart of claim 3 wherein the third substantially horizontal top track follower member comprises a roller operatively attached to the bottom end of the first flexible sheet of transparent material.

5. The golf cart of claim 1 wherein the first substantially horizontal top track follower member comprises a slide member operatively attached to the top of the first flexible sheet of transparent material.

6. The golf cart of claim 5 including a third substantially horizontal top track follower member operatively connected to the bottom of the first flexible sheet, the third substantially horizontal top track follower member being disposed in the first track on a front portion thereof and disposed in the second track at the rear thereof.

7. The golf cart of claim 6 wherein the third substantially horizontal top track follower member comprises a slide member operatively attached to the bottom end of the first flexible sheet of transparent material.

\* \* \* \* \*